May 24, 1927.
R. L. HUFFMAN
1,630,180
SURVEYOR'S INSTRUMENT
Filed Oct. 28, 1926
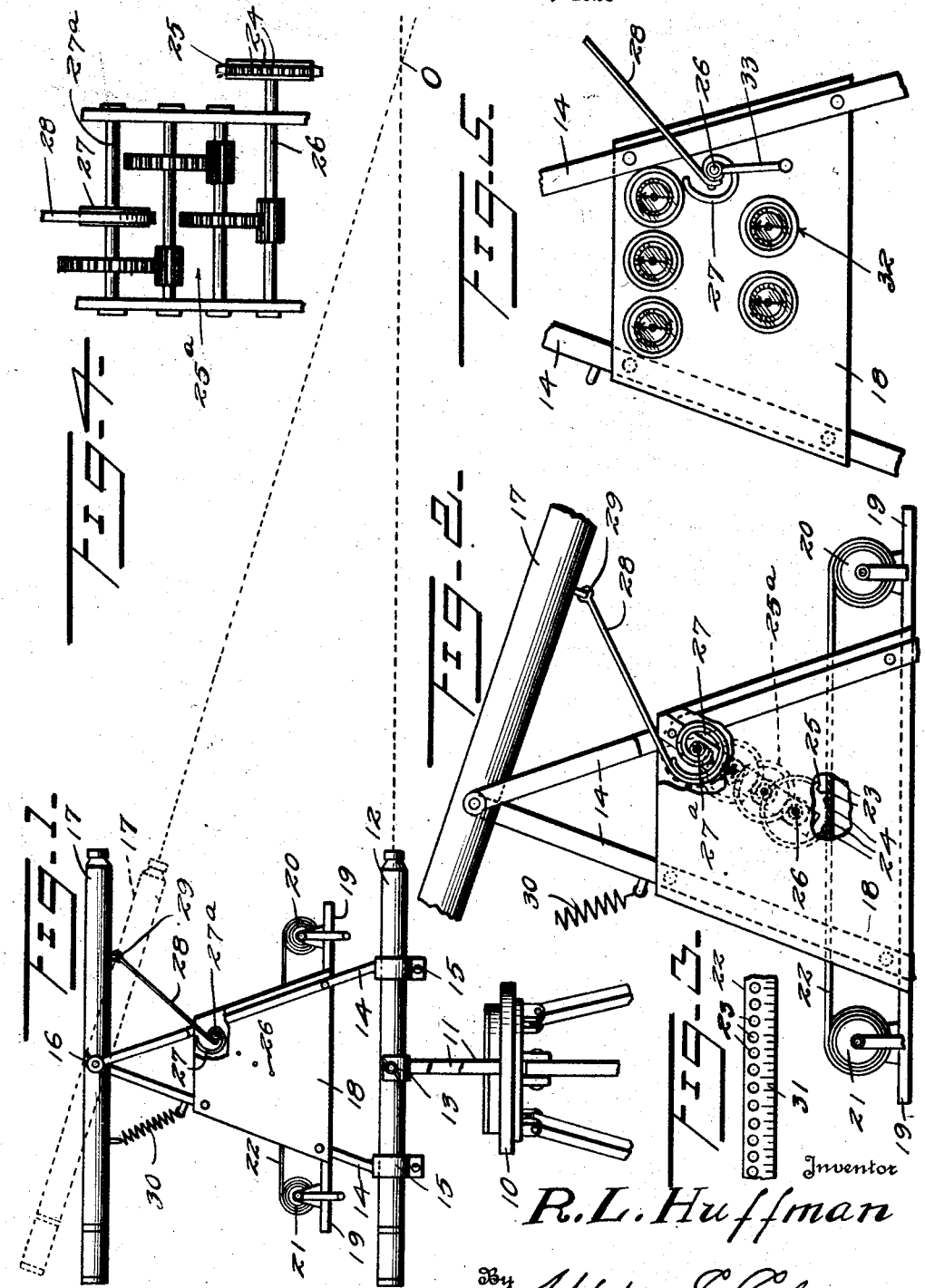
Inventor
R. L. Huffman
By Watson E. Coleman
Attorney Patented May 24, 1927.

1,630,180

UNITED STATES PATENT OFFICE.

ROBERT LEE HUFFMAN, OF SOUTH MIAMI, FLORIDA.

SURVEYOR'S INSTRUMENT.

Application filed October 28, 1926. Serial No. 144,756.

This invention relates to surveyors' instruments and more particularly to a device for measuring distances.

An important object of the invention is to provide a device of this character which is capable of registering the distances to a plurality of points from any given fixed point, thus enabling corners to be determined at a single center.

A further object of the invention is to produce a device of this character which may be readily and cheaply constructed and which may be employed with the ordinary surveyor's telescope.

Other objects and advantages will be apparent from the following description.

In the accompanying drawings, I have illustrated a preferred embodiment of my invention.

Figure 1 is a side elevation of a surveyor's instrument constructed in accordance with my invention, the instrument being shown in dotted lines in the position which it assumes when determining the distance to an objective;

Figure 2 is an enlarged view partially broken away to show the interior mechanism;

Figure 3 is a fragmentary plan of the belt employed;

Figure 4 is a fragmentary sectional view showing the gear train employed for driving the cam;

Figure 5 shows a modified structure in which a counter is employed instead of the belt of Figures 1, 2 and 3.

Referring now more particularly to the drawings, the numeral 10 indicates a table of an ordinary surveyor's instrument from which arise the usual supports 11, between the upper ends of which is pivoted the sight tube 12. The pivotal connection, indicated at 13, includes means for clamping the tube 12 in adjusted positions. This structure is contained in the ordinary surveyor's instrument and forms no portion of my invention, except in combination with the structure hereinafter recited.

In accordance with my invention, I provide a pair of supports 14 having means at their lower ends, indicated at 15, whereby they may be rigidly clamped to the tube 12. At their upper ends, the supports provide a pivotal mounting 16 for a second tube 17 similar to the tube 12 in all particulars. This tube may likewise be clamped in adjusted positions about its pivot. The pivot 16 is so arranged that the tube 17 swings with its axis in a plane including the axis of the tube 12, so that these tubes, by manipulation of the tube 17, may be caused to converge upon a desired objective 0.

Mounted upon the supports 14 between the tubes 12 and 17 is a casing 18 having at opposite sides thereof platforms 19 upon which are mounted reels 20 and 21. A tape 22 is connected at its ends to the reels 20 and 21 so that as this tape is wound upon one reel, it is unwound from the other. This tape has a series of longitudinally spaced openings 23 in which are adapted to engage teeth 24 of a gear wheel 25 mounted upon a shaft 26. The shaft 26 and gear wheel 25 form a portion of a gear train $25^a$ which drives a shaft $27^a$. This shaft $27^a$ bears a substantially spiral cam 27, to the inner end of which is secured one end of a flexible element 28, the outer end of which is secured to one end of the tube 17, as at 29. The opposite end of the tube 17 is connected with one of the supports 14 by a spring 30, so that the flexible element 28 is maintained under tension. In the use of this device, for determining the distance from a given point to an objective 0, the tube 12 is first focused upon the objective and then secured. The tube 17 is then focused upon the objective by rotating the drum 21, so that the rack provided by the openings 23 of the tape 22 will cause the rotation of the gear train $25^a$ and accordingly of the cam 27, shortening the effective length of the flexible element 28 and drawing the end of the tube 17 nearest the objective 0 toward the corresponding end of the tube 12. The tape 22 has graduations 31 from which the distance may be read when both tubes are focused upon the objective. By the use of the cam 27, the graduations 31 may be uniformly spaced, so that reading thereof is simplified.

If desired, tape 22, its drums 20 and 21 and gear train 25 may be substituted for by a suitable counter mechanism such as generally indicated at 32 in Figure 4. This counter mechanism will be operated from the gear 25 and any suitable means, such as crank 33, may be provided for rotating the shaft 26.

Since the constructions hereinbefore set forth are obviously capable of a certain range of change and modification without materially departing from the spirit of the invention, I do not limit myself to such specific structures except as hereinafter claimed.

I claim:—

In a surveying instrument for measuring distances, a sight tube, a second sight tube connected to and spaced from the first named sight tube and pivoted to swing upon its axis in a plane including the axis of the first named sight tube whereby said sight tubes may be converged upon an objective, a rotatable cam means connecting said cam with the shiftable tube to shift the same and means for rotating said cam including a shaft upon which the cam is mounted, a gear train driving said shaft and a longitudinally shiftable belt having perforations for coaction with the teeth of a gear of said gear train, said belt having graduations providing an indication of the distance to the point upon which the tubes are converged.

In testimony whereof I hereunto affix my signature.

ROBERT LEE HUFFMAN.